US 6,655,504 B2

(12) United States Patent
Glovatsky et al.

(10) Patent No.: US 6,655,504 B2
(45) Date of Patent: Dec. 2, 2003

(54) BRAKING ASSEMBLY AND SYSTEM

(75) Inventors: Andrew Zachary Glovatsky, Plymouth, MI (US); Robert Edward Belke, West Bloomfield, MI (US); Jay DeAvis Baker, Dearborn, MI (US); Joseph Mario Giachino, Farmington Hills, MI (US); Lakhi Nandlal Goenka, Ann Arbor, MI (US); Myron Lemecha, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/904,408

(22) Filed: Jul. 12, 2001

(65) Prior Publication Data

US 2002/0043434 A1 Apr. 18, 2002

Related U.S. Application Data

(60) Provisional application No. 60/218,493, filed on Jul. 14, 2000.

(51) Int. Cl.[7] ............................................... F16D 55/08
(52) U.S. Cl. ...................... 188/72.1; 188/2 D; 188/382; 188/71.1; 188/249; 188/259; 303/20
(58) Field of Search .................. 188/72.2, 2 D, 188/382, 72.1, 72.7, 249, 259, 71.1, 268; 303/3, 20, 1; 267/69–74; 74/489, 572, 491, 501.6, 500.5, 625; 244/133; 160/222–226; 464/97

(56) References Cited

U.S. PATENT DOCUMENTS

| 3,425,519 | A | * | 2/1969 | Frigger |
| 3,430,736 | A | * | 3/1969 | Long |
| 3,583,531 | A | * | 6/1971 | Besoyan |
| 3,638,766 | A | * | 2/1972 | Besoyan |
| 4,280,753 | A | | 7/1981 | Neubauer |
| 4,575,200 | A | | 3/1986 | Humiston |
| 5,222,200 | A | | 6/1993 | Callister et al. |
| 5,222,699 | A | | 6/1993 | Albach et al. |
| 5,639,065 | A | | 6/1997 | Lin |
| 5,692,585 | A | | 12/1997 | Kazuro et al. |
| 5,713,557 | A | | 2/1998 | Kang |
| 5,810,291 | A | | 9/1998 | Geiger et al. |
| 5,913,494 | A | | 6/1999 | Burbridge et al. |
| 5,918,834 | A | | 7/1999 | Sommer et al. |
| 5,927,651 | A | | 7/1999 | Geders et al. |
| 5,931,422 | A | | 8/1999 | Geiger et al. |
| 5,941,480 | A | | 8/1999 | Wille |
| 5,947,417 | A | | 9/1999 | Cameron |
| 5,947,422 | A | | 9/1999 | Wille |
| 5,958,803 | A | | 9/1999 | Geiger |
| 5,975,463 | A | | 11/1999 | Gruensfelder et al. |
| 5,979,828 | A | | 11/1999 | Gruensfelder et al. |
| 5,988,567 | A | | 11/1999 | Wille |
| 6,027,074 | A | | 2/2000 | Cameron et al. |
| 6,048,581 | A | | 4/2000 | Waldrop, III |
| 6,053,477 | A | | 4/2000 | Price |
| 6,068,215 | A | | 5/2000 | Gruensfelder et al. |
| 6,076,766 | A | | 6/2000 | Gruensfelder |
| 6,089,505 | A | | 7/2000 | Gruensfelder et al. |
| 6,092,764 | A | | 7/2000 | Geders et al. |
| 6,142,501 | A | | 11/2000 | Fogo et al. |

(List continued on next page.)

*Primary Examiner*—Douglas C. Butler
(74) *Attorney, Agent, or Firm*—Brinks Hofer Gilson & Lione

(57) ABSTRACT

A braking unit is provided. In one embodiment, the braking unit comprises a base member, a guide member, a flexible rod, an actuator adapted to induce deformation of the rod, and a brake pad. One end of the flexible rod is fixedly attached to the base member while another end is slideably disposed within a passageway defined by the guide member. The brake pad is positioned adjacent the flexible rod such that deformation of the rod causes lateral movement of the brake pad. The braking unit can be incorporated into disc and drum-type braking assemblies and systems.

10 Claims, 4 Drawing Sheets

U.S. PATENT DOCUMENTS

| | | |
|---|---|---|
| 6,193,025 B1 | 2/2001 | Nakagawa |
| 6,213,572 B1 | 4/2001 | Linkner, Jr. et al. |
| 6,230,949 B1 | 5/2001 | O'Connell et al. |
| 6,234,284 B1 | 5/2001 | Ashman et al. |
| 6,234,585 B1 | 5/2001 | Harris et al. |
| 6,386,338 B1 * | 5/2002 | Powrozek .................. 188/2 D |

* cited by examiner

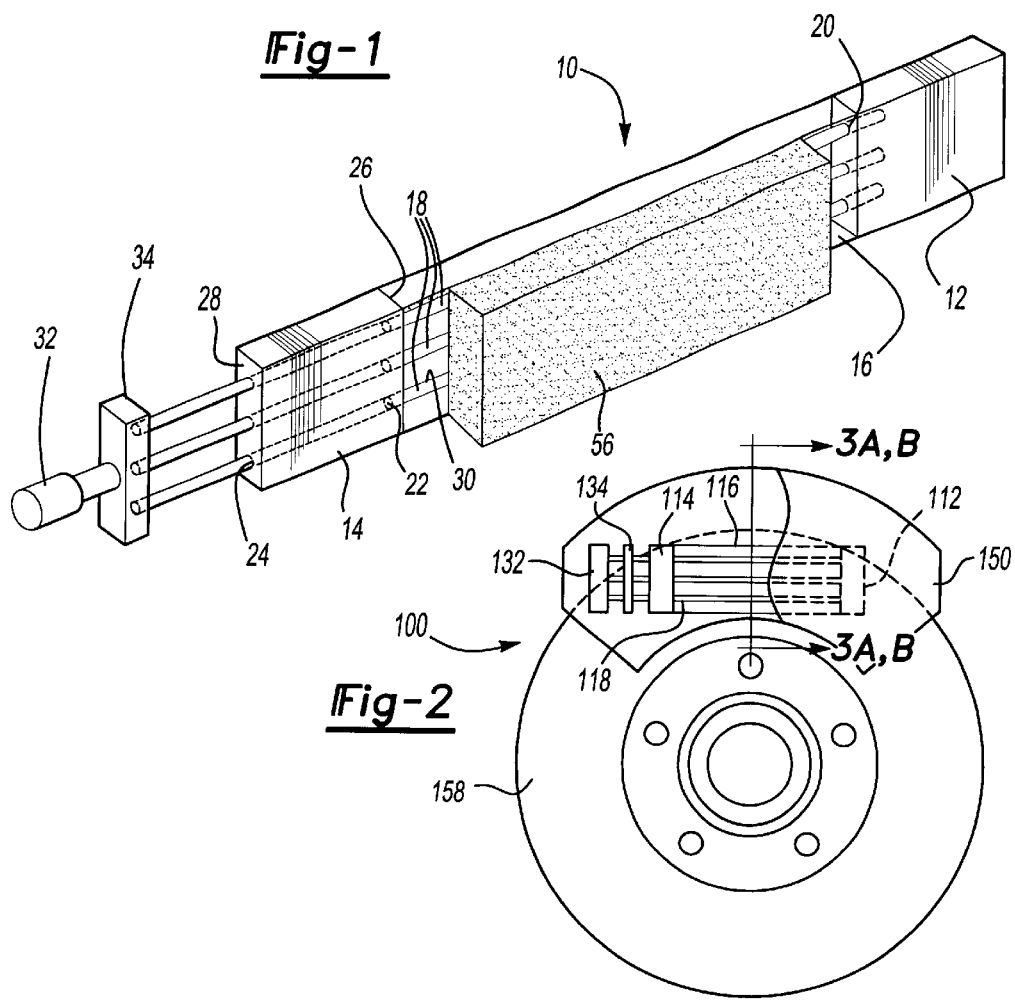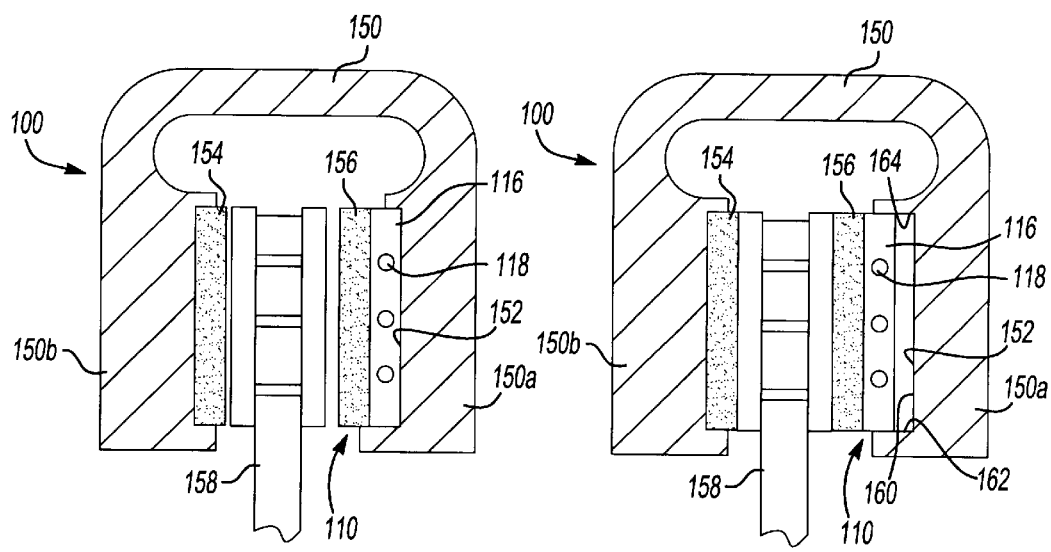

BRAKING ASSEMBLY AND SYSTEM

REFERENCE TO PREVIOUS APPLICATION

This application claims the benefit of U.S. Provisional application Ser. No. 60/218,493 filed on Jul. 14, 2000.

FIELD OF THE INVENTION

The present invention relates to braking assemblies for slowing the motion of a vehicle. More particularly, the invention relates to braking assemblies and systems that use selectively deformable members to induce frictional engagement between a brake pad and a rotatable braking surface to slow the motion of a vehicle.

BACKGROUND OF THE INVENTION

Motor vehicle braking assemblies typically include a brake pad that is positioned adjacent a rotatable braking surface. Frictional engagement between the brake pad and braking surface works to slow the motion of the vehicle. Frequently, the brake pad is mounted onto a piston or a shoe that is selectively movable between two positions. Hydraulics are conventionally employed to move the piston or shoe and the attached brake pad between engaged and non-engaged positions.

SUMMARY OF THE INVENTION

The present invention provides a braking assembly that eliminates the need for the brake pad to be directly mounted to a piston to control the frictional engagement between the brake pad and a rotatable braking surface. The assembly utilizes a braking unit that comprises a base member, a guide member having first and second opposing faces and defining a passageway between the first and second faces, at least one flexible rod attached to the base member and disposed in the passageway, a brake pad positioned adjacent the flexible rod, and an actuator adapted to induce deformation of the rod. One end of the rod is fixedly attached to the base member and the second end is capable of slideable movement within the passageway. As such, deformation of the rod induces movement of the brake pad, which can be used to frictionally engage a braking surface.

The assembly includes a rotatable braking surface, which can comprise a conventional disc or drum.

The present invention also provides a braking system. In a preferred embodiment, the braking system includes a plurality of braking assemblies operably connected to a controller, such as a foot pedal. The braking system is particularly well-suited for incorporation into motor vehicles, such as automobiles.

BRIEF DESCRIPTION OF THE DRAWINGS

FIG. 1 illustrates a perspective view of a braking unit in accordance with the present invention.

FIG. 2 illustrates a side view of a braking unit in accordance with a first preferred embodiment of the present invention.

FIG. 3A illustrates a cross-sectional view of the braking assembly shown in FIG. 2, taken along line 3—3, in a non-engaged configuration. FIG. 3B illustrates the assembly in an engaged configuration in which the brake pad is in frictional contact with the rotatable braking surface.

DETAILED DESCRIPTION OF THE INVENTION

Figure 4A:
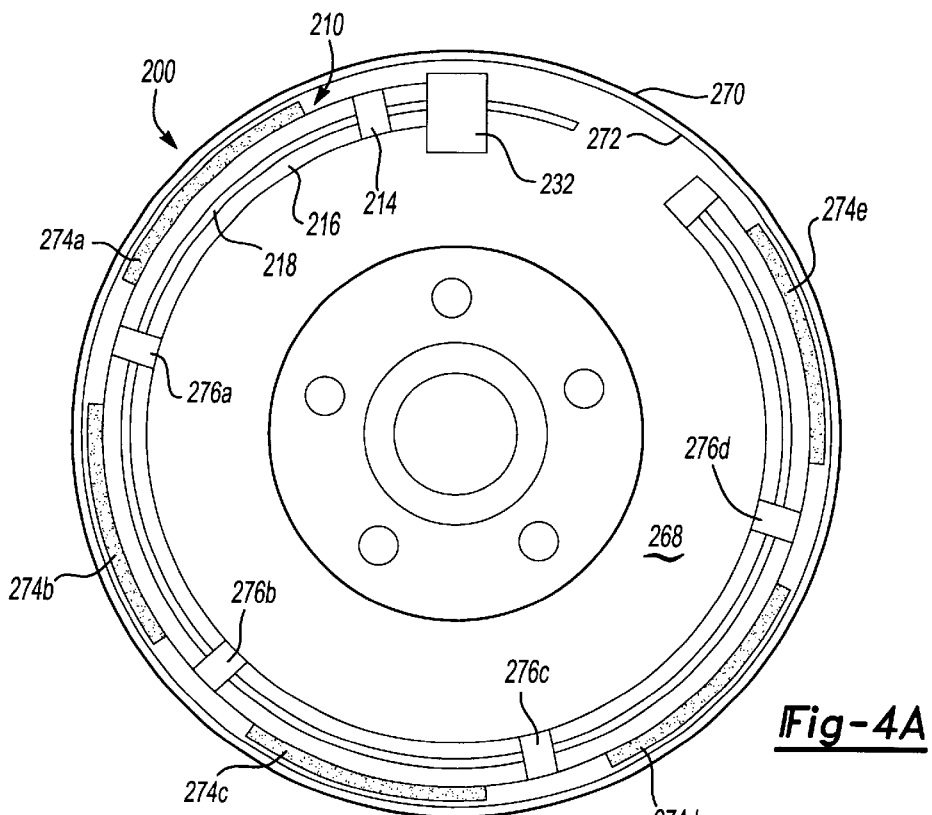
FIG. 4A illustrates a side view of a braking assembly in accordance with a second preferred embodiment of the present invention in a non-engaged configuration.

The following description of preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

FIG. 1 illustrates an example of a braking unit 10 in accordance with the present invention. The unit 10 preferably includes a base member 12, a guide member 14, and a flexible panel 16 extending between the base 12 and guide 14 members. One or more flexible rods 18 extend through the flexible panel 16 and into both the base 12 and guide 14 members. The base 12 and guide 14 members are preferably secured to a surface, such as a mounting member in a braking assembly, as will be developed more fully below. Also, the unit 10 includes a brake pad 56 positioned adjacent the flexible rod 18. Preferably, as illustrated in the figure, the brake pad is positioned adjacent the rod 18 and directly adjacent the flexible panel 16.

The base member 12 preferably defines one or more openings 20 that receive and retain one end of the rods 18. In the base member 12, the openings 20 preferably retain the rods 18 such that the rod 18 cannot move within the opening 20. The rod 18 may be secured in the opening 20 by any of a variety of means, including an adhesive bond between the rod 18 and block 12, mechanical attachment, such as crimping, or by way of a fastener, etc. Alternatively, the rod can be secured to a face of the base member 12.

The guide member 14 defines openings 22 that provide a passageway 24 from a first face 26 to an opposing second face 28 of the member 14. Each opening 22 receives a second end of a rod 18 and allows the rod 18 to move freely through the passageway 24. Preferably, a free end of each rod 18 extends past the second edge 28 so that the rod 18 can be deformed by passing a portion of the free end into the passageway 24, as will be developed more fully below.

The flexible panel 16 can be omitted if desired. In this embodiment, the brake pad 56 is preferably secured to the rods 18. If present, the panel 16 preferably comprises a flexible polymeric material that surrounds the portion of the rod 18 that lies between the base 12 and guide 14 members. In this arrangement, deformation of the rod 18 induces stretching or deformation of the flexible panel 16, which ultimately moves the brake pad 56. Particularly preferable, the flexible panel 16 comprises an elastomeric material. Alternatively, the flexible panel 16 can comprise any flexible material that is able to stretch or deform to a desired degree and return to its original form. The appropriate degree of ability to deform will depend on the application. For applications of the present invention, the flexible panel 16 is preferably capable of stretching to 150% of its normal length and still be able to return to its original length and form. Examples of suitable materials for use in the flexible panel of the present invention include rubber, silicones, silicone rubbers, polyurethanes, and flexible acrylics.

The flexible panel 16 defines one or more cavities 30 that receive the rods 18. Preferably, the flexible panel 16 defines one cavity 30 for each rod 18. Alternatively, the flexible panel may define a single, relatively large cavity that receives a plurality or all of the rods 18. The cavities 30 receive the rods 18 in a manner that allows the rods 18 to move within the cavities 30. That is, the flexible panel 16 is preferably able to slide over the rods 18, via the cavities 30, as the rods 18 are pushed or pulled into or out of the cavities 30.

The rods 18 are also flexible in nature. Preferably, the rods comprise a composite material that is sufficiently flexible to allow the flexible panel 16 to stretch to its full capacity. Also preferable, the rods 18 are able to bend and/or deform in a manner that confers a smooth, continuous shape to the flexible panel 16, if present. Composite materials, such as carbon fiber and polymeric materials, provide the desired flexibility when acted upon by an external mechanical force, such as a pushing or pulling action, which will be developed more fully below. As an alternative to composite materials, the rods 18 can comprise any material that possesses the desired flexibility. Examples of suitable alternative materials for use in the rods of the present invention include aluminum, steel and alloyed iron.

The rods 18 preferably comprise elongate, cylindrical shaped members that can be secured to the base member 12 and can be threaded through the passageway(s) 24 of the guide member 14 and the cavity(ies) 30 of the flexible panel 16. Alternatively, any other suitable shape, such as the flexible plates described in U.S. Pat. No. 5,810,291 to Geiger, et al., for a CONTINUOUS MOLDLINE TECHNOLOGY SYSTEM, which is hereby incorporated by reference in its entirety, can be utilized. Also alternatively, a series of individual rods positioned in parallel or twisted together can be utilized. Of course, the shape of the passageway(s) 24 and cavity(ies) 30 is preferably complimentary to that of the rods 18 such that the desired flexibility can be achieved.

The unit 10 also preferably includes an actuator 32. The actuator 32 is a device capable of inducing stretching of the flexible panel 16 and the rods 18. The type of actuator used will depend on the nature of the rods 18. For example, a mechanical actuator can be utilized to push or pull the rods 18 such that the desired stretching is achieved. The actuator 32 preferably comprises a motor or other mechanical device. Particularly preferred, the actuator 32 is a motor having a cam 34 that can induce stretching in the rods 18. Alternatively, any other suitable actuator that can induce stretching can be utilized, such as actuators employing hydraulic, pneumatic, or electrical means of inducing movement.

The actuator 32 can interact with the unit 10 to achieve the desired stretching in a variety of ways. For example, the actuator 32 can be attached to the free end of each rod 18 such that the actuator 32 can push or pull the rod 18 into or out of the passageways 24 and cavities 30. Alternatively, the cam 34 can be positioned such that it pushes or pulls the rod 18, either at the free end or at another location along its length, such that the rod 18 and flexible panel 16 stretch. Also, it is preferred that the actuator 32 be able to induce stretching in all rods 18 present in the unit 10. Alternatively, the actuator 32 may induce stretching in only one rod 18, or a subset of rods 18.

The brake pad 56 is positioned adjacent the flexible rod 18 such that deformation of the rod 18 forces the pad 56 to move. Preferably, the pad 56 is connected to the rod 18. Any suitable connection can be utilized, and bolts or rivets are preferred. Also preferable, if a flexible panel 16 is present in the braking unit 10, the pad 56 is positioned directly adjacent the flexible panel 16. As shown in FIG. 1, it is preferred that the pad 56 substantially span the length of the flexible panel 16 and that the center of the pad 56 be positioned adjacent the center of the flexible panel 16.

Any conventional brake pad can be utilized as the brake pad 56 in the present invention. Preferably, the brake pad 56 has some flexibility such that it can deform as the flexible panel 16 and/or rod 18 deforms. Alternatively, a rigid pad or pad assembly can be utilized. When a rigid pad is used, the pad should be positioned adjacent the rod 18 and/or flexible panel 16 such that the lack of flexibility does not hinder the ability of the pad to frictionally engage a rotatable braking surface. Also preferable, a pad appropriate for the type of rotatable braking surface in the braking assembly is utilized. For example, when the rotatable brake surface comprises a disc, any suitable disc brake pad can be utilized. Likewise, when the rotatable braking surface comprises a drum, any suitable drum brake pad can be utilized. Examples of suitable disc brake pads include those described in U.S. Pat. No. 6,234,284 to Ashman et al. for a FRICTION PAD FOR A DISC BRAKE ASSEMBLY, U.S. Pat. No. 6,193,025 to Nakagawa for a DISK-BRAKE PAD; and U.S. Pat. No. 5,692,585 to Kazuro et al. for a BRAKE PAD WITH A WEAR INDICATOR.

FIGS. 2, 3A and 3B illustrate a first preferred embodiment of a braking assembly 100 in accordance with the present invention. Like reference numbers in these Figures refer to similar features and/or components illustrated in FIG. 1. FIG. 3A illustrates the braking assembly 100 of FIG. 2 in a non-engaged configuration, while panel B illustrates the braking assembly 100 in an engaged configuration.

As shown in FIG. 2, the braking assembly 100 includes a braking unit 100 connected to a mounting surface 150. In this embodiment, as best illustrated in the FIG. 3A and FIG. 3B, the mounting surface 150 preferably comprises a caliper having first 150a and second 150b arms. Also preferable, the first arm 150a defines a recess 152 that receives the braking unit 110. The recess 152 provides a back surface that ensures that deformation of the flexible rod 118 and flexible panel 116 occurs in the direction of the clearance between the first 150a and second 150b arms of the caliper 150.

First 154 and second 156 brake pads are positioned on opposing sides of a rotatable braking surface 158. In this embodiment, the rotatable braking surface 158 comprises a disc. Any conventional disc used in disc brake systems can comprise the rotatable braking surface of this embodiment.

The first brake pad 154 is preferably connected to the caliper 150 such that it is able to frictionally engage the disc 158 when the disc 158 is in contact with the pad 154. The second brake pad 156 is preferably connected to the flexible rod 118 of the braking unit such that deformation of the rod 118 by the actuator 132 induces movement of the pad 156 toward the disc 158. As shown in FIG. 3B, this movement eliminates the clearance between the brake pad 156 and the disc 158, resulting in a frictional engagement between these element.

As illustrated in the figures, the braking unit 110 preferably includes a flexible panel 116 and the brake pad 156 is preferably positioned adjacent the flexible panel 116. Particularly preferable, the brake pad is connected to the flexible panel 116.

Figure 4B:
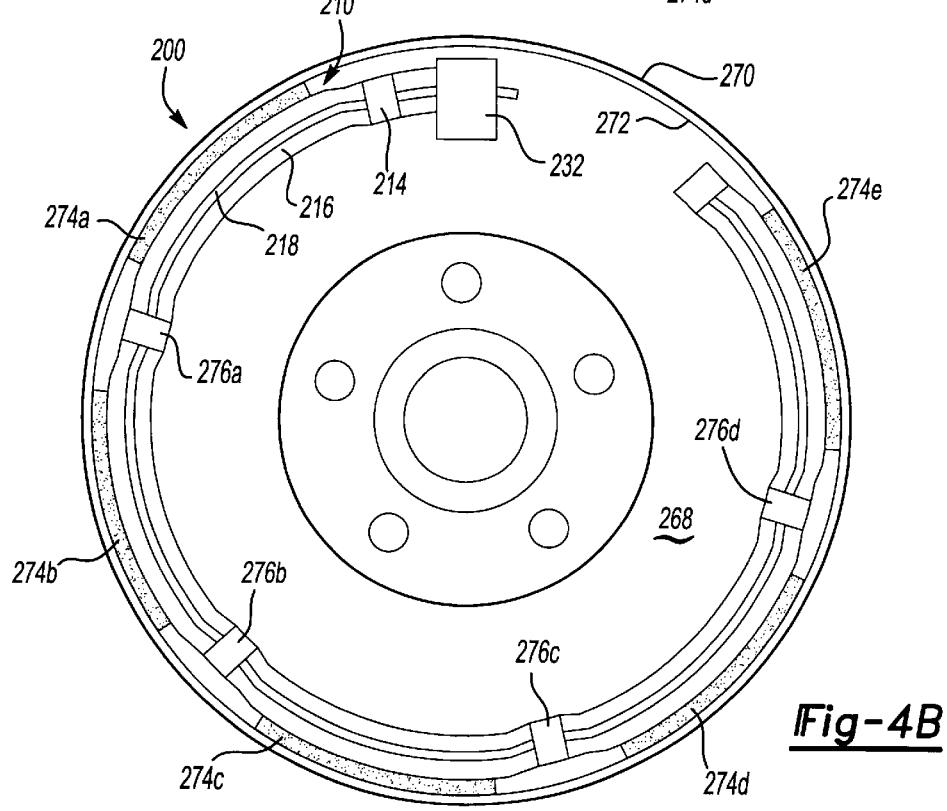
FIG. 4B illustrates the assembly in an engaged configuration in which the brake pad is in frictional contact with the rotatable braking surface.

A connector 136 is connected to the actuator 132 of the braking unit 110 and is adapted to be operably connected to a controller (not illustrated in FIGS. 2 and 3) of a braking system (not illustrated in FIGS. 2 and 3), as will be developed more fully below FIG. 4A and FIG. 4B illustrate a braking assembly 200 in accordance with a second preferred embodiment of the present invention. This embodiment is similar to the first preferred embodiment except as detailed below. Accordingly, like reference numbers in FIG. 4 refer to similar features and/or components of the first preferred embodiment.

In this embodiment, the braking assembly 200 comprises a drum brake assembly. The braking unit 210 is mounted to a mounting member 268, such as a hub, such that the attached brake pad 274 is positioned opposite a rotatable drum 270. The brake pad 274 is positioned such that it is able to frictionally engage an inner surface 272 of the drum 270 when the rod 218 and/or flexible panel 216 of the braking unit 210 are deformed by the actuator 232.

As illustrated in the figures, the braking unit 210 in this embodiment preferably comprises a series of brake pads 274a–274e connected to an elongated rod 218 and flexible panel 216. Disposed between each pair of brake pads 274 is an additional attachment member 276a–276e. These attachment members 276 are preferably identical to guide member 214 except that the passageway in attachment members 276 slideably receives a middle portion of the flexible rod 218, as opposed to an end portion. The attachment members 276 are preferably secured to the mounting member 268 such that the actuator 232 is able to induce deformation of the rod 218 and panel 216 at points between the attachment members 276 by pushing or pulling on the second end of the rod 218. This allows the actuator 232 to induce frictional contact between a plurality of brake pads 274 and the inner surface 272 of the drum 270. FIG. 4B illustrates the frictional contact achieved by action of the actuator 232.

Figure 5A:
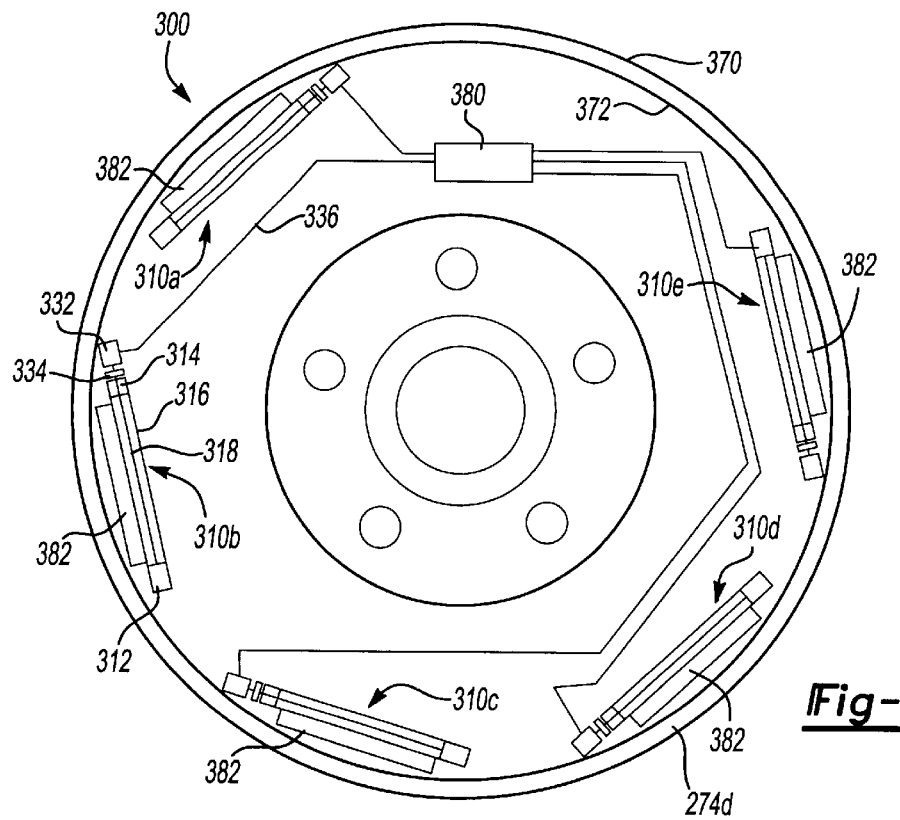
FIG. 5A illustrates a side view of a braking assembly in accordance with a third preferred embodiment of the present invention in a non-engaged configuration.
Figure 5B:
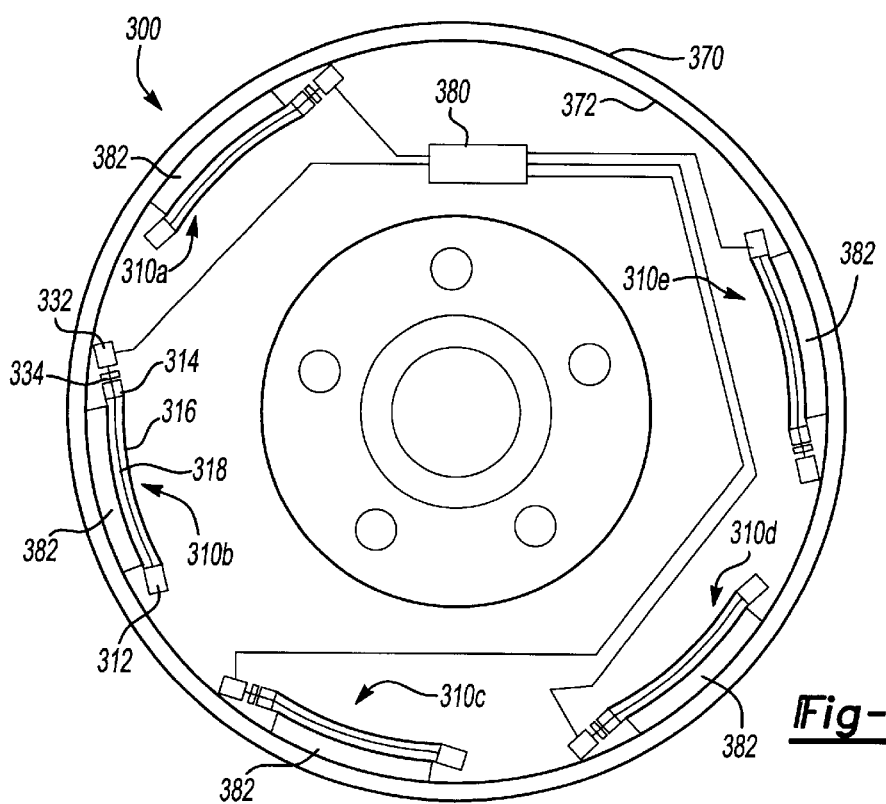
FIG. 5B illustrates the assembly in an engaged configuration in which the brake pad is in frictional contact with the rotatable braking surface.

FIG. 5A and FIG. 5B illustrate a braking assembly 300 in accordance with a third preferred embodiment of the present invention. This embodiment is similar to the second preferred embodiment except as detailed below. Accordingly, like reference numbers in FIG. 5 and FIG. 5B refer to similar features and/or components illustrated in FIG. 4A and FIG. 4B, respectively.

In this embodiment, the braking assembly 300 comprises a mounting member 368, a drum 370, and a plurality of independent braking units 310a–310e. Each braking unit 310 includes a brake pad 382 positioned such that it can frictionally engage an inner surface 372 of the drum 370 upon deformation of the rod 318 and flexible panel 316 of the unit 310.

Preferably, a distributor 380 is operably connected to the actuator 332 of each braking unit 310. The type of distributor utilized will depend on the type of actuators employed, and any suitable distributor capable of distributing a single input into multiple outputs can be utilized. Preferably, the distributor 380 comprises a hydraulic device capable of relaying a single input into multiple hydraulic outputs.

Figure 6:
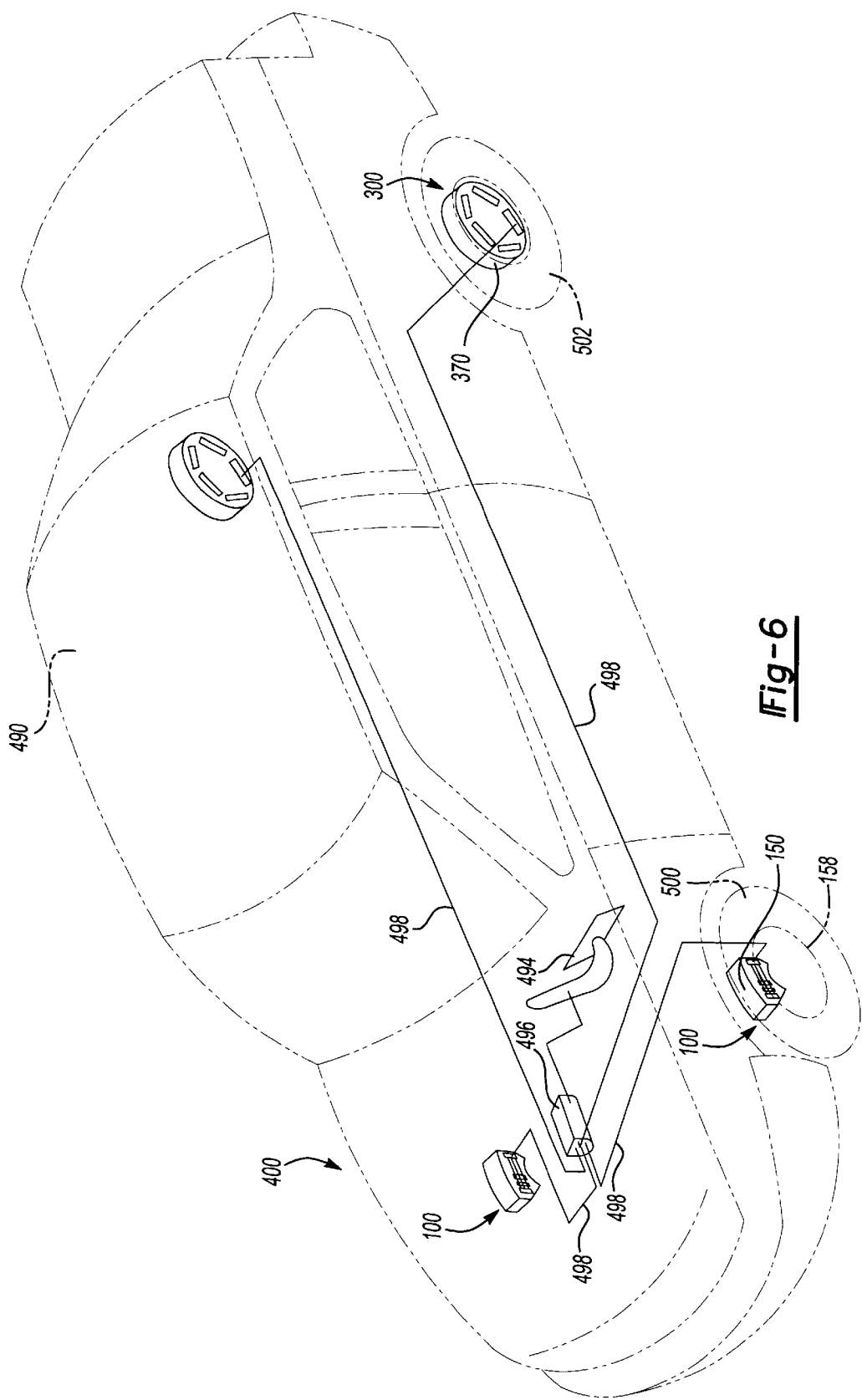
FIG. 6 illustrates a perspective view of a vehicle braking system in accordance with the present invention.

FIG. 6 illustrates a preferred embodiment of a braking system 400 in accordance with the present invention. Again, like reference numbers in FIG. 6 refer to similar features and/or components illustrated in the previous figures.

The system 400 is adapted for use in a motor vehicle 490. As used herein, the term vehicle is not limited to automobiles, and includes any type of device in which it is desirable to selectively slow the motion of a rotating element attached to or forming a part of the device. The vehicle 400 includes axles 492, a primary controller 494, a primary distributor 496, and a series of brake lines 498. Also, the vehicle has two front 500 and two rear 502 wheels. Rotatable braking surfaces are associated with each wheel of the vehicle. Preferably, as shown in the figure, the rotatable braking surface in each of the front wheels 500 comprises a disc 458 and the rotatable braking surface in each of the rear wheels 502 comprises a drum 470 Appropriately, the braking assembly associated with each of the front wheels 500 preferably comprises a disc-brake assembly in accordance with the present invention. Likewise, the braking assembly associated with each of the rear wheels 502 preferably comprises a drum-brake assembly in accordance with the present invention.

The primary controller 494 is operably connected to each actuator 432 of each braking assembly. Preferably, the primary controller 494 is adapted to move between two positions: active and inactive positions. Also preferable, the primary controller 494 is operably connected to the actuator 432 of each braking assembly such that the actuator 432 induces deformation of the rod 418 and the flexible panel 416, when the controller 494 is moved to the active position. This causes the brake pad 456,474 to frictionally engage the rotatable braking surface 458,470, which slows the motion of the wheel 500,502. Preferably, as shown in the figure, the primary controller 494 comprises a brake pedal disposed in the passenger compartment of the vehicle 490 such that a user of the vehicle 490 can move the primary controller 494 to the active position by depressing the primary controller 494 with his or her foot.

A distributor 496 can be operably connected to the primary controller 494 such that a single input (movement of the controller 494 into the active position) is divided into multiple outputs (activation of each actuator 432 to induce deformation of the corresponding rod 418 and flexible panel 416 in several braking assemblies). A master cylinder known to those skilled in the art can comprise the distributor 496.

The brake lines 498 provide the operable connections between the primary controller 494 and the actuator 432 of each braking unit 410. The type of brake line used will depend on the mode of operation of the primary controller 494 and actuators 432. Examples of suitable brake lines for use in the present invention include hydraulic, mechanical, electrical, and electromechanical lines known in the art. The brake lines 498 need only be able to induce activation of the actuators 432 to deform the rods 418 in response to movement of the controller 494 into the active position.

The references cited in this disclosure, except to the extent that they may contradict any statement or definition made herein, are hereby incorporated by reference in their entirety.

The foregoing disclosure is the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

We claim:

1. A braking assembly for slowing motion of a vehicle, said braking assembly comprising:
    a rotatable braking surface operably connected to said vehicle;
    a mounting surface positioned adjacent the rotatable braking surface; and
    a braking unit comprising a base member secured to the mounting surface; a guide member secured to the mounting surface, the guide member having first and second opposing faces and defining a passageway extending between the first and second opposing faces; at least one flexible rod having first and second ends, the first end being fixedly attached to the base member and the second end being disposed in the passageway and being capable of slideable movement within the passageway; a flexible panel disposed around the at least one flexible rod and between the base and guide members; a brake pad connected to the flexible rod and positioned adjacent the rotatable braking surface; and
    an actuator adapted to induce deformation of the rod and initiate frictional contact between the brake pad and rotatable braking surface.

2. A braking assembly in accordance with claim 1, wherein the rotatable braking surface comprises a disc having opposing sides and wherein the brake pad is positioned adjacent one of the sides.

3. A braking assembly in accordance with claim 2, wherein the mounting surface comprises a caliper having first and second opposing arms, and wherein a portion of the disc is disposed between the first and second arms.

4. A braking assembly in accordance with claim 3, wherein the first arm defines a recess and the braking unit is disposed substantially in the recess.

5. A braking assembly in accordance with claim 3, wherein a second brake pad is secured to the second arm.

6. A braking assembly in accordance with claim 1, wherein the actuator comprises a mechanical actuator attached to the second end of the rod and adapted to selectively push or pull the second end of the rod with respect to the passageway in order to induce deformation of the rod.

7. A braking assembly in accordance with claim 1, wherein the actuator is adapted to push the rod at a point between the first and second ends.

8. A braking unit for frictionally engaging a rotatable braking surface, comprising:
    a base member;
    a guide member having first and second opposing faces and defining a passageway extending between the first and second opposing faces;
    at least one flexible rod having first and second ends, the first end being fixedly attached to the base member and the second end being disposed in the passageway and being capable of slideable movement within the passageway;
    a flexible panel disposed around the at least one flexible rod and between the base and guide members;
    a brake pad positioned adjacent the flexible rod such that deformation of the flexible rod induces movement of the brake pad; and
    an actuator adapted to induce deformation of the rod.

9. A braking unit in accordance with claim 8, wherein the brake pad is connected to the flexible rod.

10. A braking unit in accordance with claim 8, wherein the brake pad is connected to the flexible panel.

* * * * *